UNITED STATES PATENT OFFICE.

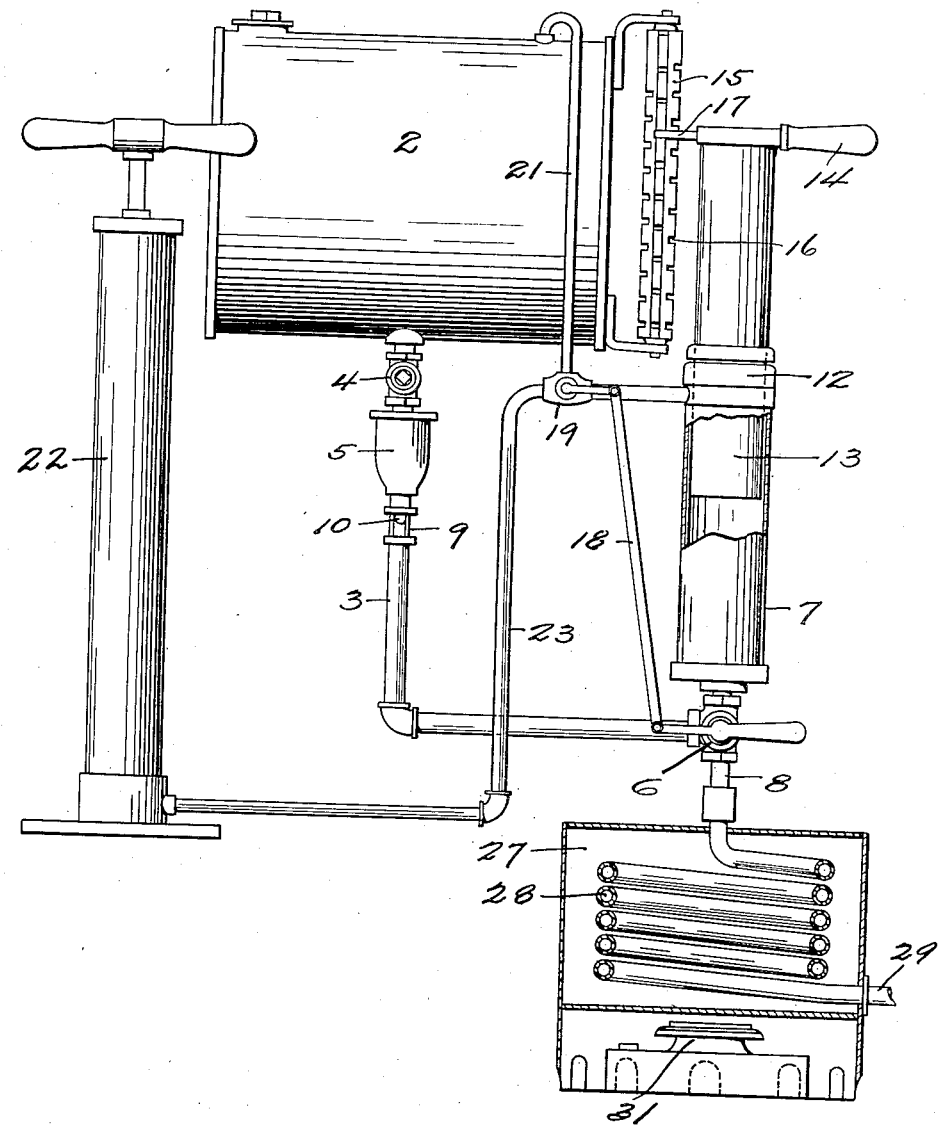

EDWARD H. CUYLER AND MARK B. PATTESON, OF LOS ANGELES, CALIFORNIA, ASSIGNORS, BY MESNE ASSIGNMENTS, TO THE PACIFIC R & H CHEMICAL CORPORATION, OF LOS ANGELES, CALIFORNIA, A CORPORATION OF CALIFORNIA.

APPARATUS FOR GASIFYING LIQUIDS.

1,336,822.  Specification of Letters Patent.  Patented Apr. 13, 1920.

Original application filed August 9, 1918, Serial No. 249,060. Divided and this application filed July 2, 1919. Serial No. 308,251.

*To all whom it may concern:*

Be it known that we, EDWARD H. CUYLER and MARK B. PATTESON, citizens of the United States, and residents of Los Angeles, county of Los Angeles, and State of California, have invented a certain new and useful Apparatus for Gasifying Liquids, of which the following is a specification.

The invention relates to apparatus for producing gas to be used for the fumigation of trees and other purposes.

This application is a division of our copending application Serial No. 249,060, filed in the United States Patent Office on August 9, 1918.

An object of the invention is to provide an apparatus for gasifying or vaporizing liquids by which definite measured quantities of gas may be produced.

Another object of the invention is to provide a portable apparatus for gasifying or vaporizing liquid hydrocyanic acid.

The invention possesses other advantageous features, some of which, with the foregoing, will be set forth at length in the following description, where we shall outline in full, that form of the invention which we have selected for illustration in the drawings accompanying and forming part of the present specification. In said drawings we have shown one specific form of our generic invention, but it is to be understood that we do not limit ourselves to such form, since the invention, as expressed in the claims, may be embodied in other forms.

The present apparatus is particularly adapted to be used in the production of hydrocyanic acid gas from liquid hydrocyanic acid, for the fumigation of citrus trees, but it is obvious that it may be employed for the production of other gases for the same or other purposes. We desire to have it understood, that in all cases, wherein reference is made to liquid hydrocyanic acid, we mean either the hydrous or the anhydrous liquid, both of which it is possible to manufacture, although the hydrous liquid is the only one now available in large quantities. In such tree fumigating operation, the tree is covered with a tent or other suitable covering, and an amount of hydrocyanic acid gas is introduced under the tent. The amount of gas required for the proper treatment of different trees varies and means are provided for producing definite dosages of gas for different trees. An excess of gas produces a deleterious effect on the tree and an insufficient amount of gas does not produce desired results. The amount of gas required for the proper treatment of trees of different size has been determined and with the apparatus of our invention, the exact amount required may be produced.

The accompanying drawing is an elevation, partly in section, of one form of apparatus of our invention.

The apparatus of our invention comprises a tank or reservoir for the liquid hydrocyanic acid, means for withdrawing definite predetermined charges of liquid from the tank and means for vaporizing the liquid and discharging it under the tent covering the tree.

In the construction shown, the liquid hydrocyanic acid is contained in the tank 2, whence it flows through the pipe 3, containing the valve 4 and the strainer 5, to the three-way valve 6, arranged at the bottom of the measuring cylinder 7. Arranged in the pipe 3 below the strainer is an indicator comprising a short length of glass tubing 9 within which is disposed a buoyant ball 10, preferably made of wood. When the liquid is flowing the ball descends and when the flow stops the ball rises. Connected to the other side of the three-way valve 6 is a discharge pipe or hose 8, and the valve 6 may be turned to establish communication between the tank and the cylinder or the cylinder and the discharge conduit 8. Arranged in the cylinder 7 and forming a tight sliding joint with the packing gland 12 at the upper end thereof, is a plunger 13, which is provided on its upper end with a handle 14 for raising it to the desired position.

Arranged on the end of the tank, in close relation to the path of the plunger, is a rotatable measuring rack 15 provided with four sets of slots 16, corresponding to gas dosages of various strengths. Extending horizontally from the upper end of the plunger is a pin 17 adapted to engage in the slots in the measuring rack, to predetermine the charge of liquid which may be introduced into the cylinder. The slots on the four racks have different spacings, and by rotating the rack, any desired dosage, within small limits, may be obtained.

It is essential that the charge contained within the cylinder be practically equal to the charge indicated on the measuring rack, because frequently a variation of one ounce of liquid in the required charge results in the failure of the fumigating operation. Further, many trees requires a charge of only one ounce of liquid and the apparatus must be constructed to measure accurately to this small quantity and means must be provided for ejecting the entire charge measured, from cylinder. These conditions produce difficulties which are overcome in the present construction.

In the construction shown, the plunger 13 is smaller in diameter than the internal diameter of the cylinder 7, providing a clearance space around the plunger, and the charge in the cylinder is ejected by introducing air under pressure into the upper part of the clearance space. The volume of this clearance space, when the plunger is depressed, should not be greater than the volume of one ounce of liquid and the width of such clearance space should be such that the liquid is not held therein by capillary attraction when the air is introduced into the cylinder for ejecting the liquid. The scale on the measuring rack is calibrated to take account of the liquid in the clearance space.

Means are provided for producing air under pressure which is introduced into the upper part of the cylinder for forcing the liquid therefrom and which is employed for atomizing the liquid ejected. An air pump 22, preferably of the hand-operated type is connected to the upper end of the cylinder, through the pipe 23. It is advantageous to introduce the air with as uniform a flow as possible and for that reason, the pump 22 is preferably of the double-acting type, although a single-acting pump and an air chamber may be used.

In order to insure the complete filling of the clear space in the cylinder with liquid, so that the charge therein will correspond to the charge indicated on the measuring rack, means are provided for discharging the air and vapor entrapped in the cylinder. Connected to the three-way valve 19 in the pipe 23 is a pipe 21 through which the entrapped air and vapors flow into the tank 2, as the cylinder is filling with liquid. The three-way valve 19 is connected to the valve 6 by the link 18 so that the motions of the two valves are synchronous. The valve ports are so disposed that when valve 6 is open to permit an inflow of liquid, valve 19 is open to permit the discharge of the entrapped air and vapor, and that when valve 6 is positioned to permit discharge of the liquid, the valve 19 is positioned to permit the inflow of air from the pump into the top of the cylinder.

In operation, the plunger is raised and held in the desired position of elevation by engagement with the measuring rack, and the valve 6 is turned to permit the charge of liquid to flow into the cylinder. When the cylinder is charged, the valve is turned to cut off further flow of liquid from the tank and to establish communication between the cylinder and the conduit 8. The pump is then operated to cause the liquid to be ejected from the cylinder.

The liquid discharges from the cylinder into the vaporizer or gasifier 27, which in the present construction comprises a coil of pipe 28 to which heat is applied for the purpose of vaporizing or gasifying the liquid. The coil may be heated in any suitable manner and the heat may be applied directly to the coil or the coil may be immersed in a heated liquid. In the present construction, the vaporizer consists of a closed receptacle in which the coil 28 is disposed. The receptacle is filled or partly filled with water or other liquid, which is heated by the burner 31 arranged below the bottom of the receptacle. By heating the liquid hydrocyanic acid, vaporization is accelerated and assured, and the possibility of the discharge of liquid under the tent is obviated. From the vaporizer or gasifier, the vapor or gas passes through a conduit 29 to the tree.

We claim:

1. An apparatus for vaporizing liquid hydrocyanic acid, comprising a tank adapted to contain a quantity of such liquid, a receptacle into which liquid passes from said tank, a plunger in said receptacle adapted to be moved to vary the volume thereof, a measuring rack associated with said plunger to indicate the volume of the receptacle, and means for introducing air under pressure into said receptacle to eject the liquid therefrom into a vaporizer wherein heat is added to the liquid until it is vaporized.

2. An apparatus for vaporizing liquid hydrocyanic acid comprising a tank adapted to contain a quantity of said liquid, a cylinder into which liquid flows from said tank, a plunger in said cylinder for varying the volume thereof, a measuring device associated with said plunger to indicate the volume of the cylinder, and means for introducing air under pressure into the cylinder to eject the liquid therefrom into a vaporizer wherein heat is added to the liquid until it is vaporized.

3. An apparatus for vaporizing liquid hydrocyanic acid comprising a tank adapted to contain a quantity of said liquid, a cylinder into which liquid flows from said tank, a plunger in said cylinder for varying the volume thereof, a measuring device associated with said plunger to indicate the volume of the cylinder, and means for introducing air under pressure into the cylinder to eject the liquid therefrom into a vaporizer consisting of a source of heat and a chamber of suitable dimensions into which the liquid hydrocyanic acid passes and to which the heat is applied.

4. An apparatus for vaporizing liquid hydrocyanic acid comprising a tank adapted to contain a quantity of said liquid, a cylinder into which liquid flows from said tank, a plunger having a passage therethrough fitted into said cylinder and movable to vary the volume of said cylinder, a stationary tube having a sliding fit in said passage, and means for introducing air under pressure into said tube to eject the liquid from the cylinder into a vaporizer consisting of a source of heat, and a set of pipe coils of suitable dimensions into which the liquid hydrocyanic acid passes and to which heat is applied.

5. An apparatus for vaporizing liquid hydrocyanic acid comprising a tank adapted to contain a quantity of said liquid, a cylinder into which liquid flows from said tank, a plunger having a passage therethrough fitted into said cylinder and movable to vary the volume of said cylinder, a stationary tube having a sliding fit in said passage, and means for introducing air under pressure into said tube to eject the liquid from the cylinder through a vaporizer wherein heat is transmitted to the liquid so that it is completely vaporized.

6. An apparatus for vaporizing liquid hydrocyanic acid comprising a tank adapted to contain a quantity of the liquid, means for withdrawing definite, predetermined amounts of liquid from the tank, and means for heating the withdrawn liquid to vaporization.

7. An apparatus for vaporizing liquid hydrocyanic acid comprising a tank adapted to contain a quantity of the liquid, means for withdrawing definite, predetermined amounts of liquid from the tank, a heater, and means for propelling the withdrawn liquid into the heater.

8. An apparatus for vaporizing liquid hydrocyanic acid comprising a tank adapted to contain a quantity of said liquid, a receptacle for receiving a predetermined amount of liquid from said tank, a heater, and means for discharging the liquid from the receptacle into said heater.

9. An apparatus for vaporizing liquid hydrocyanic acid comprising a tank adapted to contain a quantity of said liquid, a receptacle for receiving a predetermined amount of liquid from said tank, means for introducing air under pressure into said receptacle to expel the liquid therefrom, and a heater into which the expelled liquid discharges.

In testimony whereof, we have hereunto set our hands at Los Angeles, California, this 25th day of June, 1919.

EDWARD H. CUYLER.
MARK B. PATTESON.

In presence of—
WM. KENNEDY,
E. A. BENNESON.